US012791048B2

(12) United States Patent
Horiguchi

(10) Patent No.: US 12,791,048 B2
(45) Date of Patent: Nov. 10, 2026

(54) COUPLING STRUCTURE FOR CLOSED CROSS-SECTION MEMBER

(71) Applicant: Isuzu Motors Limited, Yokohama (JP)

(72) Inventor: Kenichi Horiguchi, Fujisawa (JP)

( * ) Notice: Subject to any disclaimer, the term of this patent is extended or adjusted under 35 U.S.C. 154(b) by 130 days.

(21) Appl. No.: 18/719,310

(22) PCT Filed: Sep. 15, 2022

(86) PCT No.: PCT/JP2022/034622
§ 371 (c)(1),
(2) Date: Jun. 13, 2024

(87) PCT Pub. No.: WO2023/112413
PCT Pub. Date: Jun. 22, 2023

(65) Prior Publication Data
US 2025/0052266 A1 Feb. 13, 2025

(30) Foreign Application Priority Data
Dec. 15, 2021 (JP) ................................ 2021-203295

(51) Int. Cl.
*F16B 5/02* (2006.01)

(52) U.S. Cl.
CPC ..................................... *F16B 5/02* (2013.01)

(58) Field of Classification Search
CPC .......... F16B 27/065; F16B 5/02; F16B 21/02; F16B 21/12
See application file for complete search history.

(56) References Cited

U.S. PATENT DOCUMENTS 2,327,585 A * 8/1943 Ulrich .................. B62D 27/065 296/30
5,040,917 A * 8/1991 Camuffo ................. F16B 35/00 411/338
5,393,095 A 2/1995 Kreis et al.
5,862,877 A * 1/1999 Horton ................. B60G 99/004 280/798
6,269,902 B1 8/2001 Miyagawa
7,201,398 B1 * 4/2007 Christofaro ............ B62D 21/12 180/312

(Continued)

FOREIGN PATENT DOCUMENTS

CN 109383621 2/2019
CN 110949522 4/2020

(Continued)

*Primary Examiner* — Matthew R McMahon

(57) ABSTRACT

Provided is the coupling structure for coupling together closed cross-section members comprising a pair of opposing through holes wherein the coupling structure includes: a pipe that has an opening at one end arranged in one of the pair of through holes and an opening at another end arranged in the other of the pair of through holes; a patch provided to the exterior of each of the closed cross-section members; a bracket abutted against the patch; and bolts that in each of the closed cross-section members are inserted through the second bolt holes, the first bolt holes, and the pipe and are tightened with a nut. The pipe is not fixed to either the closed cross-section members or the patch, and the diameter of the pair of through holes is greater than the outer diameter of the pipe.

6 Claims, 5 Drawing Sheets

(56) References Cited

U.S. PATENT DOCUMENTS

| | | | | |
|---|---|---|---|---|
| 8,292,357 | B2 * | 10/2012 | Caliskan ................ | B62D 25/00<br>296/204 |
| 9,027,945 | B2 * | 5/2015 | Leibl ...................... | B62D 21/11<br>280/124.109 |
| 9,434,423 | B2 * | 9/2016 | Pertlik ................... | B62D 21/02 |
| 2005/0151394 | A1 | 7/2005 | Grueneklee et al. | |
| 2007/0176406 | A1 * | 8/2007 | Ruehl .................... | B62D 21/02<br>280/785 |
| 2007/0200391 | A1 | 8/2007 | Thoms | |

FOREIGN PATENT DOCUMENTS

| | | |
|---|---|---|
| DE | 4138778 | 6/1992 |
| DE | 10351137 | 2/2005 |
| DE | 202005006305 | 2/2006 |
| DE | 102013008758 | 11/2014 |
| DE | 102019102309 | 7/2020 |
| JP | 63-112287 | 5/1988 |
| JP | 64-032980 | 2/1989 |
| JP | H02-064408 | 5/1990 |
| JP | 2000-238657 | 9/2000 |
| WO | WO 03/072421 | 9/2003 |

* cited by examiner

COUPLING STRUCTURE FOR CLOSED CROSS-SECTION MEMBER

TECHNICAL FIELD

The present disclosure relates to a coupling structure for a closed cross-section member.

BACKGROUND ART

For example, PTL 1 discloses a structure for attaching a suspension arm via a bracket to a side member having a closed cross-section. This bracket includes a pipe that is inserted into the side member and into which a bolt is inserted, and a hanger to which one end of the pipe is welded and that supports, outside the side member, the suspension arm.

CITATION LIST

Patent Literature

PTL 1
Japanese Utility Model (Registration) Application Laid-Open No. 2-64408

SUMMARY OF INVENTION

Technical Problem

Meanwhile, as methods of coupling side members each having a closed cross-section to each other, a method of joining side members by welding and a method of welding a nut to the inside of a closed cross-section and fastening a bolt with the nut from the outside of the cross-section are known in the related art. However, these methods have problems in terms of costs and strength.

Thus, the above-described bracket is considered to be used to couple side members each having a closed cross-section to each other. In this case, however, problems including a bearing surface depression and an axial force decrease of a bolt may occur.

An object of one aspect of the present disclosure is to provide a coupling structure that is for a closed cross-section member and that is capable of suppressing a bearing surface depression and an axial force decrease of a bolt.

Solution to Problem

A coupling structure according to one aspect of the present disclosure is a coupling structure for a closed cross-section member, the coupling structure coupling a first closed cross-section member and a second closed cross-section member to each other, the first closed cross-section member and the second closed cross-section member each having a pair of through holes facing each other with a space between the pair of through holes, the coupling structure including: pipes each having an opening portion at one end thereof and another opening portion at another end thereof, the opening portion at the one end being disposed at one of the pair of through holes with the other opening portion at the other end being disposed at another one of the pair of through holes in an inner portion of a corresponding one of the first closed cross-section member and the second closed cross-section member; a patch having a first bolt hole that has a diameter smaller than an outside diameter of each of the pipes, the patch being provided at respective outer portions of the first closed cross-section member and the second closed cross-section member such that the first bolt hole is in communication with the pair of through holes; a bracket having a plurality of second bolt holes, the bracket being in contact with the patch such that each of the plurality of second bolt holes is in communication with the first bolt hole of the patch that is provided at respective faces of the first closed cross-section member and the second closed cross-section member, the respective faces being present on a same side; and bolts that are each inserted into a corresponding one of the second bolt holes, the first bolt hole, and a corresponding one of the pipes in a corresponding one of the first closed cross-section member and the second closed cross-section member and are each fastened with a nut, in which the pipes are not fixed to any of the first closed cross-section member, the second closed cross-section member, and the patch, and in which a diameter of each of the pair of through holes is larger than the outside diameter of each of the pipes.

Advantageous Effects of Invention

According to the present disclosure, it is possible to suppress a bearing surface depression and an axial force decrease of a bolt.

DESCRIPTION OF EMBODIMENTS

Hereinafter, an embodiment of the present disclosure will be described with reference to the drawings. Components common among the drawings are given the same signs, and description of these components is omitted, as appropriate.

Figure 3:
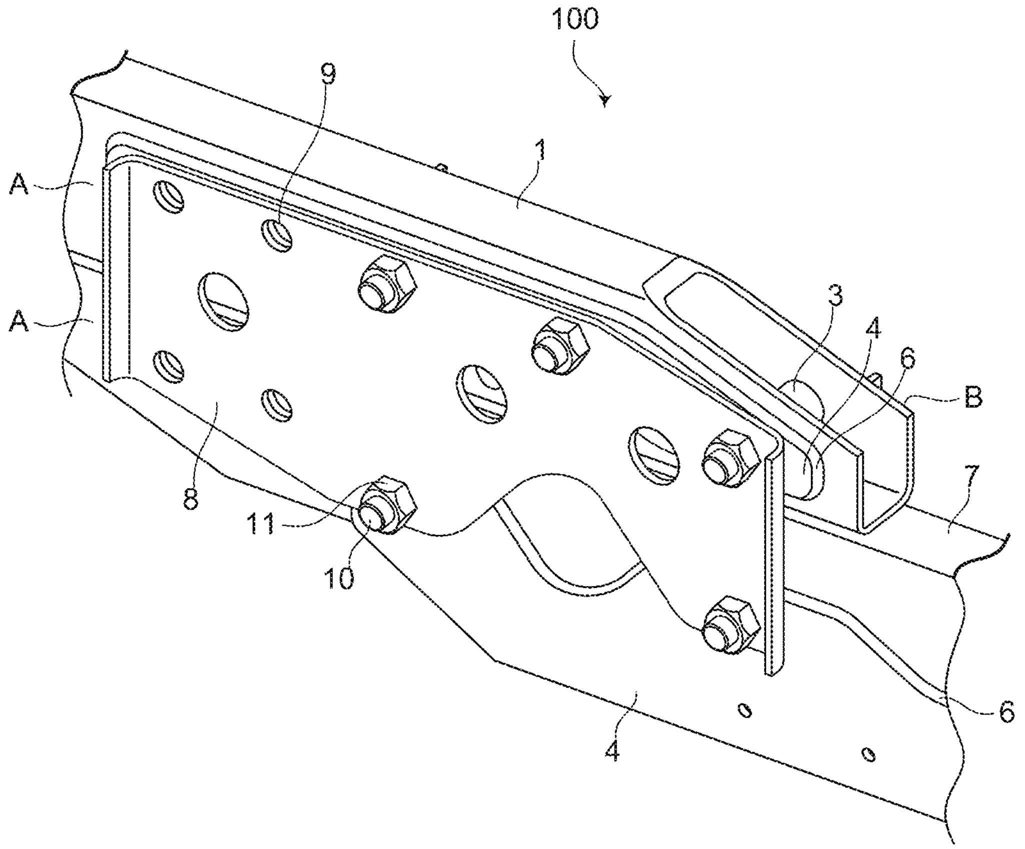
FIG. 3 is a perspective view of a coupling structure according to an embodiment of the present disclosure.
Figure 4:
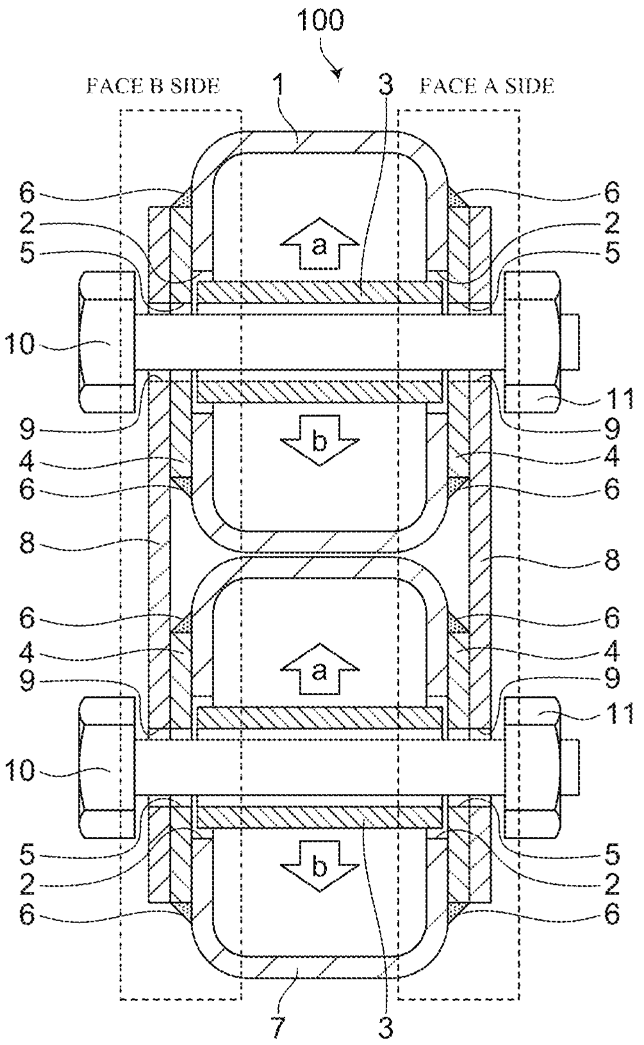
FIG. 4 is a schematic sectional view of the coupling structure according to an embodiment of the present disclosure.

First, with reference to FIG. 1 and FIG. 2, side member 1, pipes 3, and patch 4 in the present embodiment will be described. FIG. 3 and FIG. 4 are also referred, as appropriate.

Figure 1:
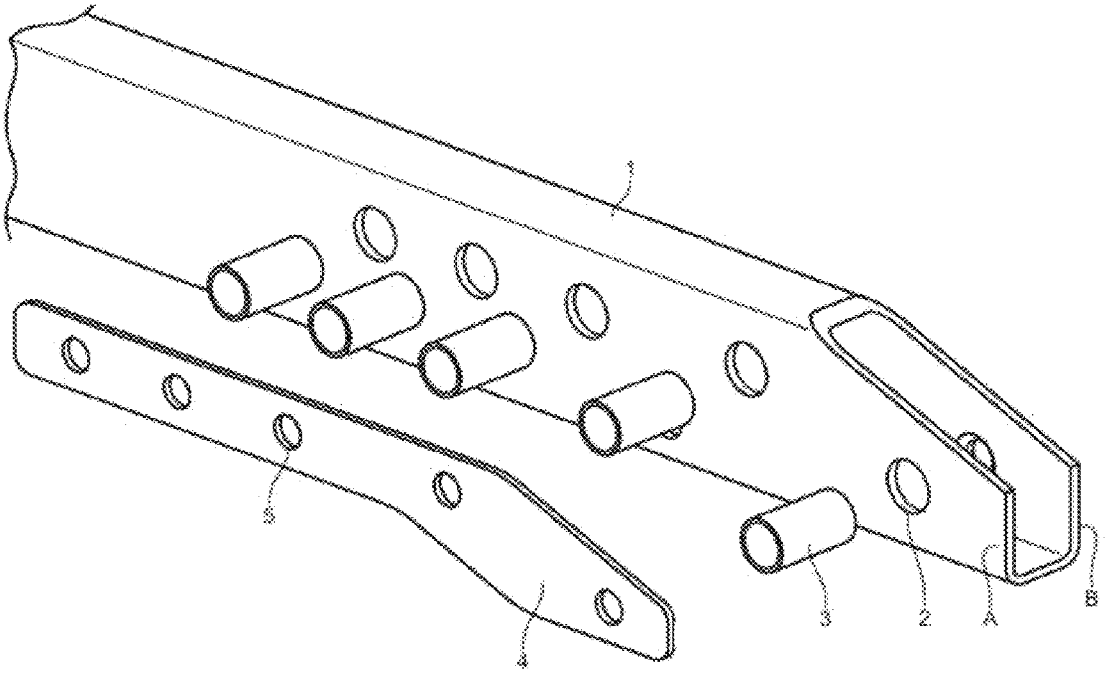
FIG. 1 is a perspective view in which a side member, pipes, and a patch according to an embodiment of the present disclosure are dismantled from each other.

FIG. 1 is a perspective view in which side member 1, pipes 3, and patch 4 are dismantled from each other. FIG. 2 is a perspective view of side member 1 to which pipes 3 and patch 4 illustrated in FIG. 1 are attached.

Side member 1 (one example of a first closed cross-section member) is a member having a closed cross-section structure and is, for example, a vehicle body frame that is to be mounted on a large commercial vehicle.

Side member 1 has face A and face B that face each other with a space therebetween. Each of face A and face B has a plurality of through holes 2 in the longitudinal direction of side member 1.

Through holes 2 on the face A side and through holes 2 on the face B side are provided to face one-to-one. That is, it can be said that side member 1 has a plurality of pairs of through holes 2 in the longitudinal direction of side member 1.

The diameter of each through hole 2 is larger than the outside diameter of each pipe 3.

Each pipe 3 is a cylindrical steel pipe through which a hole extends in the axial direction with opening portions (no signs are given) at two ends thereof.

A plurality of pipes 3 the number of which corresponds to the number of the pairs of through holes 2 are provided. Each Pipe 3 is inserted into side member 1 (into the closed cross-section) through a corresponding one of through holes 2 on the face A side or the face B side. At this time, the opening portion at one end is disposed at the corresponding through hole 2 on the face A side, and the other opening portion at the other end is disposed at the corresponding through hole 2 on the face B side (see FIG. 4).

Pipes 3 are not fixed to either of side member 1 and patch 4 and are disposed inside side member 1 (see FIG. 4).

Bolts 10 illustrated in FIG. 3 and FIG. 4 are inserted into pipes 3 corresponding thereto. With pipes 3 functioning as deformation preventers, it is possible to suppress a loss of the axial force of bolts 10 and possible to ensure a required fastening force.

Patch 4 is a plate-shaped long member. Patch 4 has a plurality of bolt holes 5 (one example of a first bolt hole) the number of which corresponds to the number of through holes 2 (pipes 3).

The diameter of each bolt hole 5 is smaller than the outside diameter of each pipe 3. In an example of the present embodiment, the diameter of each bolt hole 5 is the same as the inside diameter of each pipe 3 (see FIG. 4).

Figure 2:
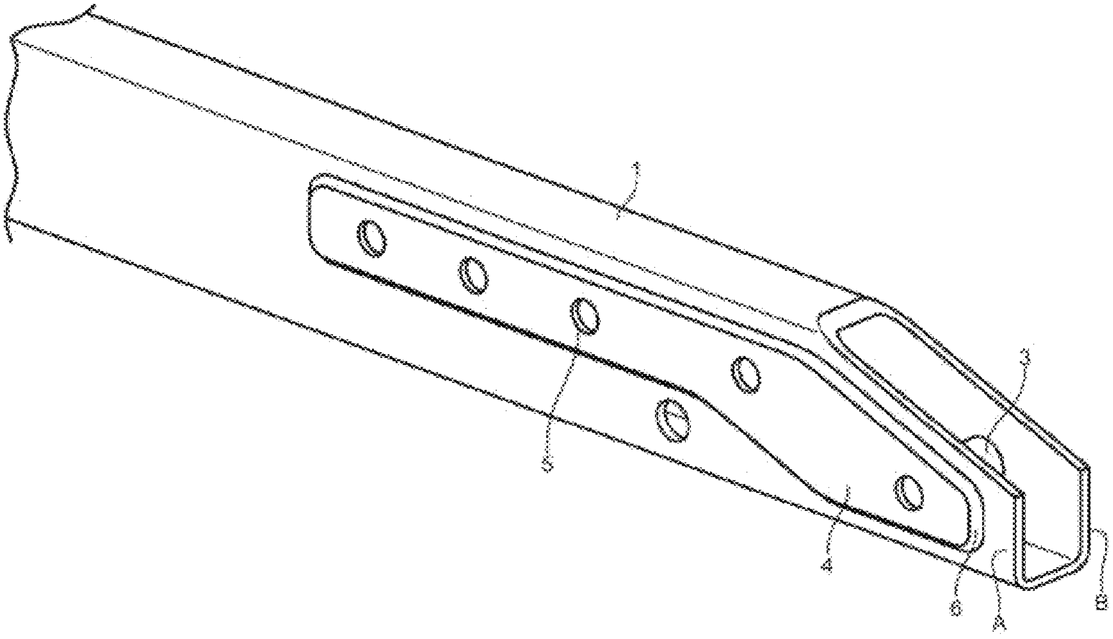
FIG. 2 is a perspective view of the side member to which the pipes and the patch according to an embodiment of the present disclosure are attached.

As illustrated in FIG. 2, patch 4 is fixed via weld portion 6 to face A of side member 1. Specifically, patch 4 is aligned such that each bolt hole 5 is in communication with a corresponding one of through holes 2 on the face A side, and patch 4 is welded to face A (see FIG. 4). While not illustrated in FIG. 2, patch 4 is also provided on the face B side similarly to the above (see FIG. 4).

With patch 4 being thus attached to each of face A and face B, it is possible to prevent each pipe 3 disposed inside side member 1 from projecting to the outside of side member 1.

Next, coupling structure 100 (one example of a coupling structure for a closed cross-section member) in the present embodiment including side member 1 illustrated in FIG. 2 will be described with reference to FIG. 3 and FIG. 4.

FIG. 3 is a perspective view of coupling structure 100. FIG. 4 is a schematic sectional view of coupling structure 100.

Coupling structure 100 is a structure in which side member 1 and side member 7 (one example of a second closed cross-section member) disposed below side member 1 are coupled to each other by using brackets 8, bolts 10, and nuts 11.

Side member 7 has the same structure as side member 1 described above. Thus, description thereof is omitted here.

Brackets 8 are each a plate-shaped member that is to be used for coupling between side member 1 and side member 7.

Each bracket 8 has a plurality of bolt holes 9 (one example of a second bolt hole) the number of which corresponds to the number of through holes 2 (pipes 3) provided in side members 1 and 7.

In an example of the present embodiment, the diameter of each bolt hole 9 is the same as the diameter (the inside diameter of each pipe 3) of each bolt hole 5 of patch 4 (see FIG. 4).

As illustrated in FIG. 3, bracket 8 is provided on respective face A sides of side members 1 and 7. Specifically, bracket 8 is aligned such that each bolt hole 9 is in communication with a corresponding one of bolt holes 5 (a corresponding one of through holes 2 on the face A side) of patch 4 provided on the respective face A sides of side members 1 and 7, and bracket 8 is in contact with patch 4 provided on the respective face A sides of side members 1 and 7 (see FIG. 4). While not illustrated in FIG. 3, bracket 8 is also provided on the respective face B sides of side members 1 and 7 similarly to the above (see FIG. 4).

As illustrated in FIG. 4, in a corresponding one of side members 1 and 7, each bolt 10 is inserted into bolt hole 9 of bracket 8 on the face B side, bolt hole 5 of patch 4 on the face B side, pipe 3, bolt hole 5 of patch 4 on the face A side, and bolt hole 9 of bracket 8 on the face A side. As illustrated in FIG. 3 and FIG. 4, nut 11 is then fastened, on the respective face A sides of side members 1 and 7, to bolt 10.

As a result of bolts 10 being thus each fastened with the nut, side member 1 and side member 7 are coupled to each other via brackets 8.

Figure 5:
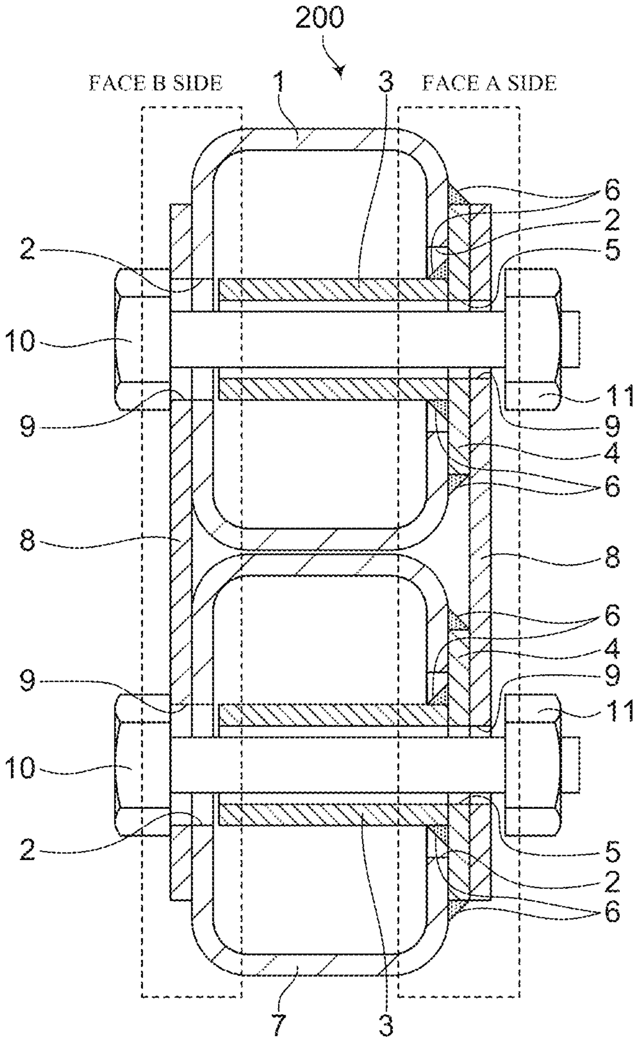
FIG. 5 is a schematic sectional view of a coupling structure according to a comparative example of the present disclosure.

Here, coupling structure 200 as a comparative example of the present disclosure will be described with reference to FIG. 5. FIG. 5 is a schematic sectional view of coupling structure 200.

In FIG. 5, the same components as those in FIG. 1 to FIG. 4 are given the same signs. Thus, description of those components is omitted in the following description. In FIG. 5, one fastening point of bolt 10 and nut 11 is illustrated in each of side members 1 and 7. However, a plurality of fastening points are actually present in the longitudinal direction of side members 1 and 7 similarly to coupling structure 100 described above.

Coupling structure 200 differs from coupling structure 100 (see FIG. 4) described above in terms of one end (an end portion on the face A side) of each pipe 3 being fixed to patch 4 by weld portion 6.

In consideration of an addition of variations of weld portions 6 between pipes 3 and patch 4, such coupling structure 200 requires increasing the diameter of each through hole 2 provided on the respective face B sides of side members 1 and 7 and the diameter of each bolt hole 9 provided in bracket 8 on the face B side so that bolts 10 at all of the fastening points can extend through the holes.

When the diameter of each through hole 2 provided on the respective face B sides of side members 1 and 7 is increased, contact between the other end (the end portion on the face B side) of each pipe 3 and a corresponding one of side members 1 and 7 is lost (in other words, the area of contact between the other end of each pipe 3 and the corresponding one of side member 1 and 7 decreases), as illustrated in FIG. 5, on the face B side. Thus, there is a likelihood that the axial force of bolts 10 may decrease.

When the diameter of each bolt hole 9 provided in bracket 8 on the face B side is increased, the area of contact between bracket 8 and the bearing surface of the head portion of each bolt 10 decreases. Thus, there is a likelihood that the bearing surface of the head portion of each bolt 10 may be depressed.

The more the number of fastening points, the more these likelihoods increase, which is a critical issue, in particular, in a structure in which strength and rigidity against a large load are required to be ensured. Such a structure is, for example, a vehicle body frame of a commercial vehicle or the like.

In contrast, in coupling structure 100 in the present embodiment, through holes 2 provided in side members 1 and 7 each have a diameter larger than the outside diameter of each pipe 3, and pipes 3 are not fixed to side member 1 or 7 or patch 4 and are enclosed in the closed cross-section of side members 1 or 7. Therefore, pipes 3 are movable in a direction (directions indicated by arrows a and b illustrated in FIG. 4) perpendicular to the axial direction of pipes 3.

Consequently, insertion of bolts 10 is not hindered by positions of pipes 3. Therefore, compared with coupling structure 200, the diameter of each through hole 2 in each of side members 1 and 7 and the diameter of each bolt hole 9 in brackets 8 can be reduced, and the bearing surface depression and the axial force decrease of bolts 10 described above can be suppressed.

Note that the present disclosure is not limited by the description of the aforementioned embodiment and can be variously modified within a scope that does not deviate from the gist of the present disclosure.

The present application is based on Japanese Patent Application (Japanese Patent Application No. 2021-203295), filed on Dec. 15, 2021, the contents of which are incorporated herein by reference.

INDUSTRIAL APPLICABILITY

The coupling structure for a closed cross-section member according to the present disclosure is useful as a structure that couples two closed cross-section members to each other.

REFERENCE SIGNS LIST

- 1, 7 side member
- 2 through hole
- 3 pipe
- 4 patch
- 5, 9 bolt hole
- 6 weld portion
- 8 bracket
- 10 bolt
- 11 nut
- 100, 200 coupling structure for closed cross-section member

The invention claimed is:

1. A coupling structure coupling a first closed cross-section member and a second closed cross-section member to each other, the first closed cross-section member and the second closed cross-section member each having a pair of through holes facing each other with a space between the pair of through holes, the coupling structure comprising:

pipes each having an opening portion at one end thereof and another opening portion at another end thereof, the opening portion at the one end being disposed at one of the pair of through holes with the other opening portion at the other end being disposed at another one of the pair of through holes in an inner portion of a corresponding one of the first closed cross-section member and the second closed cross-section member;

a first patch having a first bolt hole that has a diameter smaller than an outside diameter of each of the pipes, the first patch being provided at an outer portions of the first closed cross-section member such that the first bolt hole is in communication with the pair of through holes;

a second patch having a first bolt hole that has a diameter smaller than an outside diameter of each of the pipes, the second patch being provided at an outer portion of the second closed cross-section member such that the first bolt hole is in communication with the pair of through holes;

a bracket having a plurality of second bolt holes, the bracket being in contact with the first patch and the second patch such that one of the plurality of second bolt holes is in communication with the first bolt hole of the first patch and another one of the plurality of second bolt holes is in communication with the first bolt hole of the second patch; and bolts that are each inserted into a corresponding one of the second bolt holes, a corresponding one of the first bolt holes, and a corresponding one of the pipes in a corresponding one of the first closed cross-section member and the second closed cross-section member and are each fastened with a nut, wherein the pipes are not fixed to any of the first closed cross-section member, the second closed cross-section member, the first patch and the second patch, and wherein a diameter of each of the pair of through holes is larger than the outside diameter of each of the pipes.

2. The coupling structure according to claim 1, wherein the first closed cross-section member and the second closed cross-section member are each a side member that is to be mounted on a vehicle.

3. The coupling structure for a closed cross section member according to claim 1, wherein the first closed cross-section member is provided above the second closed cross-section member.

4. The coupling structure according to claim 1, wherein each of the first patch and the second patch comprises a pair of patches that sandwich the pair of through holes from both sides, and wherein the pipes are not fixed to any of the pair of patches.

5. The coupling structure according to claim 1, wherein the opening portion of each of the pipes does not protrude from the pair of through holes.

6. The coupling structure according to claim 1, wherein the first closed cross-section member is in contact with the second closed cross-section member.

* * * * *